C. M. WHEELOCK.
COMBINATION GAS AND ELECTRIC OUTLET CLAMP.
APPLICATION FILED NOV. 16, 1912.
1,073,722.
Patented Sept. 23, 1913.
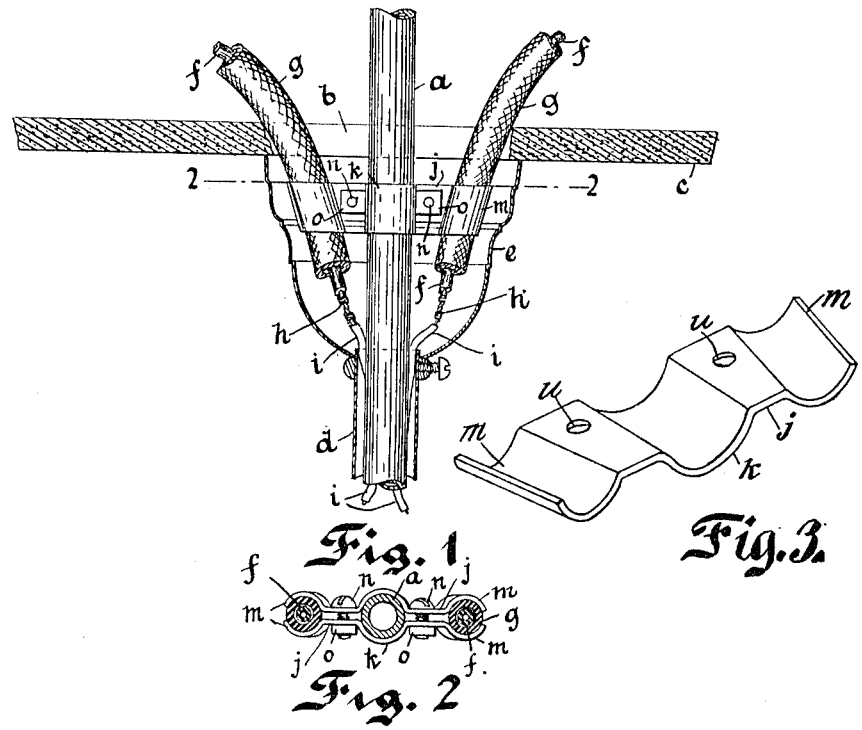
Witnesses
Edward Kozick
Eleanor Rink
Carl M. Wheelock, Inventor
By George Detmore
Attorney

UNITED STATES PATENT OFFICE.

CARL M. WHEELOCK, OF MILWAUKEE, WISCONSIN, ASSIGNOR TO NEW PROCESS SPECIALTY COMPANY, A CORPORATION OF WISCONSIN.

COMBINATION GAS AND ELECTRIC OUTLET CLAMP.

1,073,722. Specification of Letters Patent. Patented Sept. 23, 1913.

Application filed November 16, 1912. Serial No. 731,654.

*To all whom it may concern:*

Be it known that I, CARL M. WHEELOCK, of Milwaukee, Wisconsin, have invented a Combination Gas and Electric Outlet Clamp, of which the following is a specification.

My invention relates to devices for securing electric wires and more particularly for securing in place pieces of flexible insulating tubing such as are used to cover electric wires at points where they pass through openings.

The object of my invention is to provide a clamp especially adapted to secure the flexible tubing at wall-and-ceiling outlets, and more particularly at points where the wires are introduced into a combination gas-and-electric lamp-bracket or chandelier.

My invention consists in providing a clamp adapted to secure the flexible tubing directly to the gas-pipe in such cases, and secure two members of flexible tubing together in approximately parallel relation in the case of simple electric outlets, in such a manner as to permit the lengths of tubing being bent at a convenient angle without cutting or injuring the same.

My invention is best understood from the accompanying drawings, wherein—

Figure 1 is a longitudinal section through the upper end of a ceiling gas-and-electric fixture, showing the gas-pipe and flexible tubing in elevation and my clamp in position thereon, also in elevation; Fig. 2 is a transverse section through the wires and pipe on the upper side of the clamp, namely on the plane 2; Fig. 3 is a perspective view of one member of the clamp shown in Figs. 1 and 2, from the inner side.

The reference letters refer each to the same part in each figure of the drawings.

In Fig. 1 is illustrated a gas pipe $a$, depending from an aperture $b$ in a ceiling $c$, and having a gas-fixture attached to the lower end thereof, only the upper portion of which, to wit, the outer tubing $d$ and the canopy $e$, is shown. Through the aperture $b$ are passed the two electric wires $f$, covered by flexible insulating tubing $g$ to protect them from abrasion and injury. These wires $f$ are connected at $h$ to the wires $i$ of the fixture in the usual manner.

My clamp comprises two symmetrical members $j$ of sheet-metal, each of which is formed with three nearly semicylindrical arched portions, to wit, the central arched portion $k$ and the two side arched portions $m$; and the latter two arched portions are made at an oblique angle with the central arched portion $k$ so as to permit of the sloping position of the flexible tubing $g$. This oblique angle is essential to the successful use of the clamp. The two members $j$ are secured together by two screws $n$, which pass through holes $o$ disposed between the central arched portions $k$ and the arched portions $m$ as shown, said screws having on their ends nuts $o$, located between the arched portions in such manner that they are prevented from turning thereby.

When the screws $n$ are tightened up they act first to draw together the two members $j$ so as to clip the pipe $a$ and thus hold the clamp in place; and then, on further tightening of the screws, the two ends of the members $j$ are drawn together so as to clamp the respective tubes $g$ to any desired degree of tightness, and it will be seen that either tube $g$ can be loosened and withdrawn or shifted in position without moving the other, or changing the position of the clamp on the gas-pipe.

In all cases it is necessary that the arched portions of the clamp stand at an oblique angle in order to permit the flexible tubing to bend correctly and prevent it from bending abruptly and thereby becoming broken, or bending the wires too abruptly where they meet the ends of the tubing, and this clamp makes unnecessary additional devices for securing the wires or tubing along the bend of the wires.

Having thus described my invention, what I claim as new and desire to secure by Letters Patent is:

A clamp for securing flexible insulating tubing to gas-pipe comprising two strips of semiflexible material having each three half-sockets respectively at the ends and between the ends thereof, adapted to receive respectively two pieces of flexible tubing in the end-sockets and a gas-pipe in the intermediate socket; the two strips being disposed in symmetrical relation; and two fastening devices located respectively between the two end-sockets and the intermediate socket and adapted to draw the two pieces together at the respective ends thereof and thereby adjust their distance to variable dimensions of said flexible tubing.

In witness whereof I have hereunto set my hand in the presence of two witnesses.

C. M. WHEELOCK.

Witnesses:
W. SCHULTZ, Jr.,
W. T. TULL.

Copies of this patent may be obtained for five cents each, by addressing the "Commissioner of Patents, Washington, D. C."